US010859594B2

(12) United States Patent
Miglioranza (10) Patent No.: US 10,859,594 B2
(45) Date of Patent: Dec. 8, 2020

(54) DETECTOR FOR A BICYCLE

(71) Applicant: CAMPAGNOLO S.R.L., Vicenza (IT)

(72) Inventor: Federico Miglioranza, Schio (IT)

(73) Assignee: Campagnolo S.r.l., Vicenza (IT)

(*) Notice: Subject to any disclaimer, the term of this patent is extended or adjusted under 35 U.S.C. 154(b) by 224 days.

(21) Appl. No.: 15/855,017

(22) Filed: Dec. 27, 2017

(65) Prior Publication Data
US 2018/0180640 A1   Jun. 28, 2018

(30) Foreign Application Priority Data

Dec. 27, 2016 (IT) .................. 102016000131281

(51) Int. Cl.
| | | |
|---|---|---|
| *G01P 3/44* | (2006.01) | |
| *B62M 9/128* | (2010.01) | |
| *B62M 9/126* | (2010.01) | |
| *B62J 99/00* | (2020.01) | |
| *B62L 1/00* | (2006.01) | |
| *B62M 9/138* | (2010.01) | |
| *B62M 9/123* | (2010.01) | |
| *G01P 3/488* | (2006.01) | |
| *G01P 3/50* | (2006.01) | |

(Continued)

(52) U.S. Cl.
CPC .................. *G01P 3/44* (2013.01); *B62J 99/00* (2013.01); *B62L 1/005* (2013.01); *B62L 3/02* (2013.01); *B62M 9/123* (2013.01); *B62M 9/126* (2013.01); *B62M 9/128* (2013.01); *B62M 9/133* (2013.01); *B62M 9/138* (2013.01); *B62M 25/00* (2013.01); *G01P 3/488* (2013.01); *G01P 3/50* (2013.01); *G01P 3/66* (2013.01); *B62J 45/40* (2020.02)

(58) Field of Classification Search
None
See application file for complete search history.

(56) References Cited

U.S. PATENT DOCUMENTS 5,545,982 A * 8/1996 Vlakancic ................. B62L 1/12
188/24.22
8,909,424 B2 12/2014 Jordan et al.
(Continued)

FOREIGN PATENT DOCUMENTS

| CN | 1281964 C | 10/2006 |
|---|---|---|
| CN | 101592539 A | 12/2009 |

(Continued)

OTHER PUBLICATIONS

EPO Office Action for EP 17208633.2—dated Oct. 11, 2019.
(Continued)

*Primary Examiner* — Paul M. West
*Assistant Examiner* — Mark A Shabman
(74) *Attorney, Agent, or Firm* — Volpe Koenig (57) ABSTRACT

A detector for a bicycle that includes a magnet, which generates a generated magnetic field, and a magnetic field sensor. The mutual position of the magnet and of the sensor is fixed, and the sensor is immersed in the generated magnetic field. A length of a path intended for a non-diamagnetic movable element is immersed in the generated magnetic field; if in said path length there is at least one actual portion of the movable element, the sensor detects the magnetic field perturbed by the actual portion of the movable element. Bicycle equipment and a bicycle derailleur are also described.

17 Claims, 7 Drawing Sheets

(51) Int. Cl.
*B62M 25/00* (2006.01)
*G01P 3/66* (2006.01)
*B62L 3/02* (2006.01)
*B62M 9/133* (2010.01)
*B62J 45/40* (2020.01)

(56) References Cited

U.S. PATENT DOCUMENTS

| | | | |
|---|---|---|---|
| 10,370,062 | B2 | 8/2019 | Bortolozzo et al. |
| 10,416,186 | B2 | 9/2019 | Nichols et al. |
| 2001/0048211 | A1 | 12/2001 | Campagnolo |
| 2004/0138017 | A1 | 7/2004 | Kitamura |
| 2009/0240858 | A1 | 9/2009 | Takebayashi |
| 2012/0035011 | A1 | 2/2012 | Menachem et al. |
| 2012/0261895 | A1* | 10/2012 | Cote .................. B62M 6/50 280/281.1 |
| 2014/0102237 | A1 | 4/2014 | Jordan et al. |
| 2014/0224039 | A1* | 8/2014 | Bjork .................. G01L 3/24 73/862.191 |
| 2014/0298943 | A1 | 10/2014 | Hashimoto |
| 2014/0345411 | A1 | 11/2014 | Miki et al. |
| 2015/0226582 | A1 | 8/2015 | Siraky et al. |
| 2016/0152301 | A1 | 6/2016 | Bortoli et al. |
| 2016/0257269 | A1 | 9/2016 | Watarai et al. |
| 2016/0272277 | A1 | 9/2016 | Hayslett et al. |
| 2016/0311491 | A1 | 10/2016 | Watarai |
| 2019/0344857 | A1 | 11/2019 | Fossato et al. |

FOREIGN PATENT DOCUMENTS

| | | |
|---|---|---|
| CN | 105644701 A | 6/2016 |
| CN | 105936324 A | 9/2016 |
| DE | 4339595 C1 | 1/1995 |
| EP | 0909940 A2 | 4/1999 |
| EP | 2452866 A1 | 5/2012 |
| EP | 2719616 A2 | 4/2014 |
| TW | 201632403 A | 9/2016 |
| WO | 2011028508 A2 | 3/2011 |
| WO | 2014059953 A1 | 4/2014 |
| WO | 2015089911 A1 | 6/2015 |

OTHER PUBLICATIONS

Ramsden, Ed: "Choosing a sensor to measure rotation" Electronic Products, retrieved from the internet: https://www.electronicproducts.com/Electromechanical_Components/Choosing_a_sensor_to_measure_rotation.aspx Jan. 9, 1999.
Italian Search Report and Written Opinion in Italian Application No. 102016000131281, dated Sep. 29, 2017, with English translation.
Italian Search Report and Written Opinion in Italian Application No. 102016000131314, dated Sep. 28, 2017, with English translation.
Aug. 28, 2020 Chinese Office Action in Chinese Application No. 201711444356.4 with English translation.

* cited by examiner

DETECTOR FOR A BICYCLE

CROSS REFERENCE TO RELATED APPLICATION(S)

This application claims the benefit of Italian Patent Application No. 102016000131281, filed on Dec. 27, 2016, which is incorporated herein by reference as if fully set forth.

FIELD OF INVENTION

The present invention relates to a detector for a bicycle.

BACKGROUND

Figure 1:
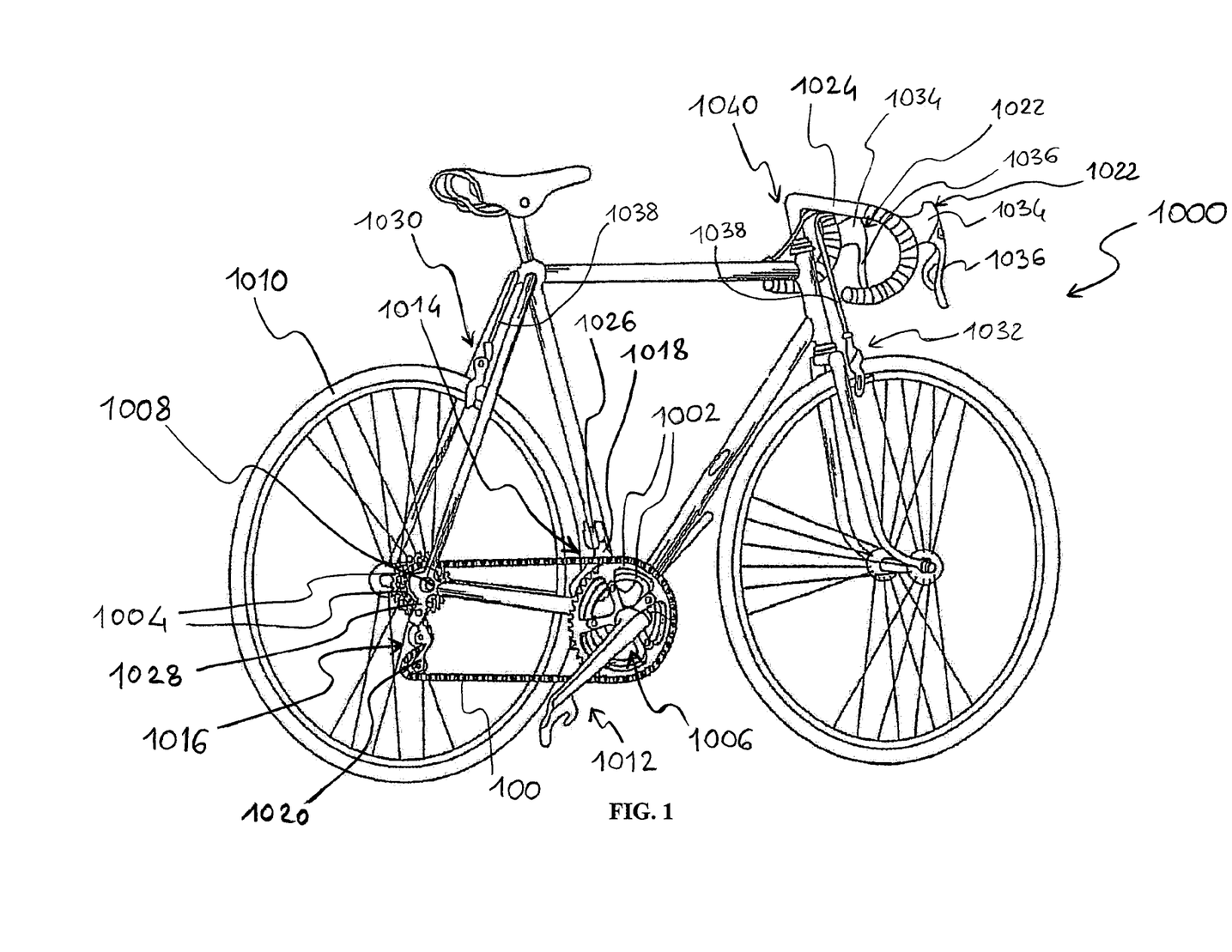
FIG. 1, already described in detail, is a side view of a bicycle provided with a gearshift according to the prior art.

With reference to FIG. 1, a motion transmission system in a bicycle 1000 comprises a chain 100 extending between toothed wheels 1002, 1004 associated with the axle of the pedal cranks 1006 and with the hub 1008 of the rear wheel 1010. When—as in the case shown—at least one of the axle of the pedal cranks 1006 and the hub 1008 of the rear wheel 1010 there is an assembly of toothed wheels 1002, 1004 comprising more than one toothed wheel 1002, 1004, and the motion transmission system is therefore provided with a gearshift 1012, a front derailleur 1014 and/or a rear derailleur 1016 are provided for.

Hereinbelow in the present description and in the attached claims, the toothed wheels 1002 associated with the axle of the pedal cranks 1006 are also called chainrings, and the toothed wheels 1004 associated with the hub 1008 of the rear wheel 1010 are also called sprockets.

In case of an electronic gearshift, each derailleur 1014, 1016 comprises a guide element 1018, 1020,—also known as chain guide or, in case of a rear derailleur, rocker arm—movable to displace the chain 100 among the toothed wheels 1002, 1004 in order to change the gear ratio, and an electromechanical actuator to move the chain guide 1018, 1020.

Each electromechanical actuator in turn typically comprises a motor, typically a suitably powered electric motor, coupled with the chain guide 1018, 1020 through a linkage such as an articulated parallelogram, a rack system or a worm screw system. However, in principle the chain guide 1018, 1020 could also be directly connected to the electric motor.

Typically, the electric motor is provided with a gear reduction mechanism. The assembly of electric motor and gear reduction mechanism is referred to hereinafter as geared motor. The actuator typically further comprises a sensor or transducer of the position, speed, acceleration and/or direction of rotation, of the rotor of the motor or of any movable part downstream of the rotor, down to the chain guide 1018, 1020 itself. It is worthwhile emphasizing that slightly different terminology from that used in this context is also in use.

Control electronics changes the gear ratio automatically, for example based on one or more detected variables such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons, typically provided on one or two manual control devices 1022 mounted on the handlebars 1024 of the bicycle 1000.

Typically, the derailleur 1014, 1016 includes a support body 1026, 1028 that is configured to be attached to the frame of the bicycle 1000, and the chain guide 1018, 1020 connected to the support body 1026, 1028 by means of two connecting rods or arms, the ends of which are pivoted to the support body 1026, 1028 and to the chain guide 1018, 1020 to form the aforementioned articulated parallelogram.

The geared motor drives the articulated parallelogram open and closed and as a consequence the displacement of the chain guide 1018, 1020 among the toothed wheels 1002, 1004.

In the case of a mechanical gearshift, the chain guide 1018, 1020 is moved by a suitable linkage driven through the traction and the release of an inextensible cable, usually sheathed (Bowden cable); in the manual control device a mechanism is provided for controlling the traction of the cable, typically comprising a cable-winding bush and an indexer for determining the rotation and the stop of the cable-winding bush in predetermined positions—"indexed bush" or "bush-indexer assembly"—as well as one or more manual actuation members, typically of the lever type, to control the bush-indexer assembly.

As an alternative or in addition to an electronic gearshift, modern bicycles are often provided with electric, electronic and electromechanical apparatuses, including suspensions, lighting systems, sensors of the travel speed, of the cadence of rotation of the pedal cranks, of the torque applied to the pedal cranks, of the slope of the travel terrain, of the heart rate of the cyclist and similar, satellite navigation systems, training devices, anti-theft systems, cycle computers capable of providing information about the status of the bicycle, of the cyclist and/or of the route, etc.

All of the aforementioned electric, electronic and electromechanical apparatuses consume electrical energy, supplied by one or more battery power supply units, possibly rechargeable. Although it is possible to exploit, for recharge, the movement of the bicycle itself through a dynamo, it is nevertheless important to save as much energy as possible. The aforementioned apparatuses are therefore in general provided not only with a proper on/off switch, but also with a standby mode.

Under wait or standby or sleep or low consumption mode, a condition in which an electric, electronic or electromechanical device is not operating, but is ready to switch from a temporary inactivity state to an operating mode is meant to be indicated; in standby mode, only those circuits that allow the device to start upon receiving commands that involve the actuation thereof are typically kept operating, thus there is a low consumption of electrical energy.

Vice-versa, in an operating mode, an electric, electronic or electromechanical device is ready to receive commands or in general inputs and to carry out tasks, even though it can be engaged only in waiting for commands and inputs, without carrying out any specific task.

The switching from a standby mode to an operating mode is indicated herein as wake of a device. More in general, under wake of a device it is meant to encompass maintaining a device in an operating mode, preventing it from entering a standby mode. A same signal or a similar signal can be used in both cases.

For bicycle apparatuses that can be reached by the cyclist, such as for example the manual control devices associated with the handgrips of the handlebars or cycle computers fixed to the handlebars or in the front part of the frame, the wake signal is easily associated with the pressing of a button or with the actuation of a lever by the cyclist.

For apparatuses arranged in parts of the bicycle remote from the hands of the cyclist, such as for example the derailleurs, brakes and suspensions, the wake signal can be a signal, specific or not, received from another on-board apparatus, for example one of the just mentioned ones. Thus, for example, the actuation of an upward gearshifting request lever by the cyclist can be used to generate a wake signal of the electronics of the manual control device of which the lever is part and/or of an electronic derailleur to which the signal is intended and is transmitted.

However, in case of apparatuses connected in a wireless network, there exists the problem that at least the wireless communication device of an apparatus must be in operating mode in order to be able to receive a signal from another apparatus. Therefore, it is not possible to exploit a remote signal as a wake signal.

In such an operating mode, the wireless communication device has a high consumption of electrical energy, and therefore it is desirable that such a mode is limited to when the bicycle is in use.

Furthermore, some of the bicycle on-board apparatuses must have very fast response times to the respective commands, and it is therefore appropriate for them to be kept in operating mode during the entire time in which the bicycle is in use.

Furthermore, some bicycle on-board apparatuses may need to be aware of, and/or have a different operation, when the bicycle is in use and when it is stationary, for example anti-theft devices, satellite navigation systems, training devices, etc.

In all of these cases, and yet in others, a detector of the movement of the bicycle is necessary or advantageous.

In particular, the signal emitted by such a movement detector can be used as wake signal of one or more devices.

US2001/048211 A1 discloses a bicycle gearshift comprising a sensor of the rotation of a crank arm or of a pulley of a rear derailleur, said rotation being interpreted as a movement of the motion transmission chain from the crank arms to the rear wheel. In the case of the crank arm, the sensor is of a potentiometric type. In the case of the rear derailleur, the sensor comprises a C-shaped magnetic element fixed to the pulley and at least one Hall-effect sensor or a Reed relay mounted on a half-cage supporting the pulleys of the chain-tensioner of the rear derailleur.

U.S. Pat. No. 8,909,424 B2 discloses a bicycle wireless electronic derailleur, comprising a control unit which includes a wireless receiver that receives shift request signals from a wireless transmitter, wherein the control unit includes a CPU and a wake sensor operatively associated to the CPU. The derailleur includes a base part attachable to the bicycle, a movable part, a chain guide attached to the movable part and a linkage that interconnects the base part to the movable part to enable the movable part to move relative to the base part by means of a motor; the control unit with the wake sensor is housed within the movable part. The wake sensor is of a vibrational type, but the document generically discloses that magnetic reed switches configured to detect magnets attached to moving elements of the bicycle might be used.

Although a bicycle can be under movement also in the absence of movement of the motion transmission chain, this typically takes place only for limited time periods, such as when riding downhill or when movement continues by inertia, and the pedals are stationary or actuated backwards. Vice-versa, it is possible for the chain to be set into motion without the bicycle being under movement only if at least the rear wheel is suspended in air, but this typically takes place voluntarily in order to carry out checks or adjustments, and thus under strict human control.

The Applicant has now recognized that the movement of the motion transmission chain is a satisfactory indication of the movement of the bicycle, at least for the most important purposes highlighted above. Furthermore, it may be appropriate and/or useful for various purposes to know whether the chain is correctly positioned.

As an alternative or in addition to a gearshift, bicycles are typically equipped with a rear brake 1030 associated with the rear wheel 1010 and/or a front brake 1032 associated with the front wheel 1034.

The manual control device of each brake 1030, 1032 typically comprises a support body 1034 fixable to the handlebars 1024 of the bicycle 1000 and a brake lever 1036 hinged to the support body 1034, to a resistant arm of which brake lever 1036 an end of a brake cable 1038, typically an inextensible sheathed cable (Bowden cable), is attached. When the brake lever 1036 is actuated by bringing the force arm closer to the handlebars 1024, the resistant arm of the brake lever 1036 moves away from the handlebars 1024, and the consequent traction of the brake cable 1038 actuates the brake by tightening the jaws of the brake caliper about the rim of the wheel 1010, 1034.

The manual control device of each brake 1030, 1032 is typically integrated with the aforementioned manual control devices 1022, so that the support body fixable to the handlebars of the two manual control devices is shared, but it can be distinct therefrom.

Brake 1030, 1032, manual control device 1022 and brake cable form a braking system 1040.

Also in the case of the brake, it may be appropriate and/or useful for various purposes to know whether the brake cable is correctly positioned, and whether it is stationary or under movement, and/or whether the jaws of the brake caliper are correctly positioned, whether they are stationary or they are under movement; an analogous problem may exist in the case of elements relative to the suspensions, and in yet other cases.

Knowing whether and how much the movable elements of a brake move can allow an assisted braking system to be implemented through suitable electronics.

SUMMARY

The Applicant has addressed the technical problem of monitoring the status of a movable element of a bicycle.

In an aspect, the solution relates to a detector for a bicycle, comprising:

a magnet that generates a generated magnetic field and a magnetic field sensor, characterized in that the mutual position of the magnet and of the sensor is fixed and the sensor is immersed in the generated magnetic field, wherein a length of a path intended for a non-diamagnetic movable element is immersed in the generated magnetic field, so that, if in said path length there is at least one actual portion of the movable element, the sensor detects the magnetic field perturbed by said actual portion of the movable element.

If there is no actual portion of movable element in the path length, the sensor detects the generated magnetic field, not perturbed.

Under "non-diamagnetic", in the present description and in the attached claims, a ferromagnetic or paramagnetic material is meant to be indicated, namely a material provided with a certain "magnetic permeance".

Under "magnetic permeance", in the present description and in the attached claims, the aptitude of a material for the passage of the magnetic field lines through the material itself is meant to be indicated.

Preferably, the movable element is elongated or wire-like.

The motion transmission chain of a bicycle is typically made, at least in part, of a paramagnetic or ferromagnetic material, that perturbs the magnetic field generated by the magnet, changing the field lines thereof.

In the case of a brake cable, a jaw of a brake caliper or other movable element, it is possible to provide the same with magnetic permeance and/or to locally modify its magnetic permeance in various ways, for example by providing segments coated with or cladded by ferromagnetic or paramagnetic material, by building it with alternating ferromagnetic or paramagnetic material and diamagnetic material, by locally changing its density of ferromagnetic or paramagnetic material, etc. For example, it is possible to fix one or more small rings of ferromagnetic or paramagnetic material along a brake cable.

First, through the aforementioned detector a direct check of the actual presence of the chain or other movable element close to the detector, in its nominal or intended path length—or, in the case of the chain, in the specific nominal path length corresponding to the current gear ratio, is advantageously carried out. It is thus possible to immediately detect breaking or dropping of the chain or other movable element, when no actual portion is detected. This allows a suitable signaling action to the cyclist and/or any precautionary action to be carried out, for example preventing the actuation of the derailleurs in order to avoid further damaging the transmission system.

Preferably, the bicycle detector comprises or is associated with electronics configured to determine that the movable element is absent from the path length when an output signal of the sensor has a first constant value, and to determine that the movable element is present in the path length when the output signal of the sensor has a different value than the first constant value.

Preferably, the movable element has a non-uniform magnetic permeance.

Preferably, the electronics is configured, alternatively or in addition, to determine that the movable element is under movement when the output signal of the sensor is variable over time, and to determine that the movable element is stationary when the output signal of the sensor has a second constant value different than the first constant value.

Preferably, the path length is of a different length than the length of a configuration of minimum length that is repeated in the movable element, or a multiple thereof.

In the case of a chain, such a configuration of minimum length that is repeated corresponds, according to the terminology adopted in the present description and in the attached claims, to a "chain link".

More preferably, the path length is of a shorter length than the length of such a configuration of minimum length that is repeated in the movable element.

In such cases, in the path length there is, at each time, a chain portion corresponding to only one chain link segment, or to one or more entire links plus a link segment, respectively. Given that the chain links do not have a uniform mass distribution and therefore do not have a uniform magnetic permeance, if the chain moves in its intended closed loop path, the detected magnetic field is variable over time, while if the chain is absent or stationary, the detected magnetic field is constant. Vice-versa, if the path length were the same length as the length of a chain link or a multiple thereof, the chain portion actually in such a path length would always be the same as a whole, although with its sub-portions displaced, and the detected magnetic field would be nearly constant, making it more difficult to detect the movement of the chain.

The same applies in the case of a movable element having a repeated or periodic configuration of magnetic permeance.

If the movable element has only a few discontinuities, as in the case of a brake cable with one or more small rings of ferromagnetic or paramagnetic material, it is preferable for the path length to have a length comparable to the length of such a small ring, so as to detect the passage thereof along the intended path length.

In this way, a direct check of the actual movement of the motion transmission chain is advantageously carried out, instead of inferring it from the movement of the members engaged therewith; similarly, it is possible to check whether another movable element is stationary or under movement.

An indication of the actual movement of the chain can advantageously be exploited. Indeed, in order to safeguard the mechanics it is appropriate for the gear ratio of the motion transmission system to be changed only when the chain is under movement. A direct check of the actual movement of the chain is in this case optimal. Indeed, in the case of breaking or jamming of the chain, the pedal cranks, the toothed wheels and the pulleys of the rocker arm of the rear derailleur could in any case turn out to be under movement, and an attempt to change gear ratio under such conditions could further damage the motion transmission system.

In the case of a brake cable or of a brake caliper, the indication of the movement can be exploited to check the integrity of the braking system or even to optimize the operation thereof, thus implementing an Anti-lock Braking System (ABS). In the case of other movable elements, the indication of the movement can be differently exploited.

Preferably, the electronics is configured, alternatively or in addition, to estimate a speed of movement of the movable element from a repetition period of an output signal of the sensor, or an approximation thereof, during an observation time window.

In this case, the movable element is preferably a chain, which intrinsically has a periodic configuration, and thus generates a periodic signal when it slides at the detector.

In this way, it is possible to directly calculate the speed of movement of the movable element, in the case of a chain without having to infer it from the rotation speed of a toothed member engaged therewith, for example a pulley of the rear derailleur.

Alternatively or in addition, preferably the electronics is configured to estimate a stroke of the movable element from the position of a characteristic configuration, preferably of a peak or a valley, in a length of the output signal of the sensor and/or from a displacement of the characteristic configuration during an observation time window.

In this case, the movable element is preferably a part of a Bowden cable or of a brake caliper.

The detector can also possibly comprise pre-processing electronics of the output signal of such a sensor, for example for amplification, filtering and/or approximation, quantization, binarization, digitalization, inversion, etcetera.

In a particularly preferred manner, the path length passes through a space between the magnet and the sensor. Such a configuration is preferable because it maximizes the perturbation of the magnetic field generated by the magnet by the movable element.

Preferably, the magnet and the sensor are aligned along a direction perpendicular to the tangent to said path length.

In this way, since the chain links and their segments detected at each time, or other elements such as for example the aforementioned small rings, follow one another along such a tangent, the detection capability is optimal.

More preferably, in the case of a chain, the magnet and the sensor are aligned along a direction parallel to the rotation axes of the toothed members engaged by the chain. In this manner, the chain is left free to vibrate and/or to change the shape of the closed loop path.

In embodiments, the magnet and the sensor are so sized that at least one second length of a second closed loop path intended for the motion transmission chain of the bicycle, at a second predetermined gear ratio, is also immersed in the generated magnetic field.

In this manner, a same magnet/sensor pair can detect the presence and/or the movement of the chain also as the gear ratio changes, and therefore as the specific closed loop configuration that the chain takes up changes.

Alternatively, different magnet/sensor combinations for the various gear ratios can be provided for.

Thus, in embodiments, the detector comprises at least one second magnet that generates a second generated magnetic field, and at least one second magnetic field sensor, wherein the mutual position of the second magnet and of the second sensor is fixed and the second sensor is immersed in the second generated magnetic field, wherein a second length of a second closed loop path intended for the motion transmission chain of the bicycle, at a second predetermined gear ratio, is immersed in the second generated magnetic field, so that, if in said second path length there is at least one actual chain portion, the second sensor detects the second magnetic field perturbed by said actual chain portion.

As an alternative or in addition, the detector comprises at least one second magnet that generates a second generated magnetic field, the mutual position of the second magnet and of said sensor is fixed, and the sensor is also immersed in the second generated magnetic field, wherein a second length of a second closed loop path intended for the motion transmission chain of the bicycle, at a second predetermined gear ratio, is immersed in the second generated magnetic field, so that, if in said second path length there is at least one actual chain portion, the sensor detects the second magnetic field perturbed by said actual chain portion.

As an alternative or in addition, the detector can possibly additionally comprise at least one second magnetic field sensor, wherein the mutual position of the magnet and of the second sensor is fixed, the second sensor is immersed in the generated magnetic field, wherein a second length of a second closed loop path intended for the chain, at a second predetermined gear ratio, is immersed in the generated magnetic field so that, if in said second path length there is at least one actual chain portion, the second sensor detects the magnetic field perturbed by said actual chain portion.

In these ways, the detector can advantageously also be used to check which the actual gear ratio is or, respectively, which toothed wheel is currently engaged by the chain. Indeed, depending on the actual gear ratio, the chain will extend along one of the closed loop path and the second closed loop path.

A detector as described above can be mounted at a suitable length of the closed loop path of the chain or in general of the path intended for the chain or other movable element, for example by providing a suitable support fixed to the bicycle frame. Such a support can for example be shaped as a small fork, wherein the magnet and the sensor are fixed to the two legs of the small fork and the path intended for and followed by the movable element extends in between.

Advantageously, the aforementioned detector is mounted in a derailleur of the motion transmission system of the bicycle.

In an aspect, the solution relates to a bicycle equipment, comprising:

a non-diamagnetic element, and a detector of the presence/movement of the element, comprising a magnet that generates a generated magnetic field, and a magnetic field sensor, wherein the mutual position of the magnet and of the sensor is fixed, and the sensor is immersed in the generated magnetic field, wherein the element is intended to be movable through the generated magnetic field.

Preferably, the element is intended to be movable along a path that passes through a space between the magnet and the sensor.

In embodiments the bicycle equipment is a derailleur, and the non-diamagnetic element is a motion transmission chain.

In other embodiments the bicycle equipment is a braking system, and the non-diamagnetic element is a brake cable or a brake caliper.

In an aspect, the solution relates to a bicycle derailleur, comprising:

a support body, configured to be mounted on a bicycle frame at an assembly of coaxial toothed wheels of the bicycle, a movable body comprising a chain guide, actuation means configured to move the movable body with respect to the support body, a detector, as stated above, where the magnet and the sensor are fixed at the chain guide.

In the case of an electronically servo-assisted gearshift, the actuation means comprise an electromechanical actuator.

In the case of a mechanical gearshift, the actuation means typically comprise a linkage actuated by a sheathed inextensible cable, or Bowden cable, set under traction through a lever.

Preferably, the magnet and the sensor are fixed at corresponding positions of opposite plates of the chain guide.

Preferably, the magnet and the sensor are fixed at respective recessed seats or notches or apertures in the plates of the chain guide.

In embodiments, the derailleur is a front derailleur.

Preferably, when the derailleur is a front derailleur, the detector comprises one of the aforementioned magnet/sensor combinations for each chainring of the gearshift.

In these cases it is possible to monitor a length of the specific closed loop path that the chain is intended to form for each chainring engaged—or presumed to be engaged—by the chain. Such a path indeed changes quite remarkably as the engaged chainring changes. The engaged chainring being equal, the closed loop path of the chain changes depending on the engaged sprocket, however the change in the path length at the front derailleur is negligible.

In embodiments, the derailleur is a rear derailleur and the chain guide comprises two pulley-carrying plates.

In this case, preferably the magnet and the sensor are fixed to said pulley-carrying plates at corresponding positions.

Preferably, the magnet and the sensor are fixed to the pulley-carrying plates at the toothing of a pulley, more preferably of the upper pulley of the chain tensioner.

In an aspect, the solution relates to the use of a magnetic field sensor in a detector of the presence/movement of a motion transmission chain of a bicycle or of a brake cable or of a brake caliper or of a jaw thereof.

BRIEF DESCRIPTION OF THE DRAWINGS

Further features and advantages of the present solution will become clearer from the following detailed description of some preferred embodiments thereof, made with reference to the attached drawings. The different features illustrated and described with reference to the individual configurations can be combined as desired. In the following description, for the illustration of the figures, identical or similar reference numerals are used to indicate constructive or functional elements with the same function or analogous function. In the drawings.

DETAILED DESCRIPTION OF THE PREFERRED EMBODIMENTS

Figures 2, 3, 4:
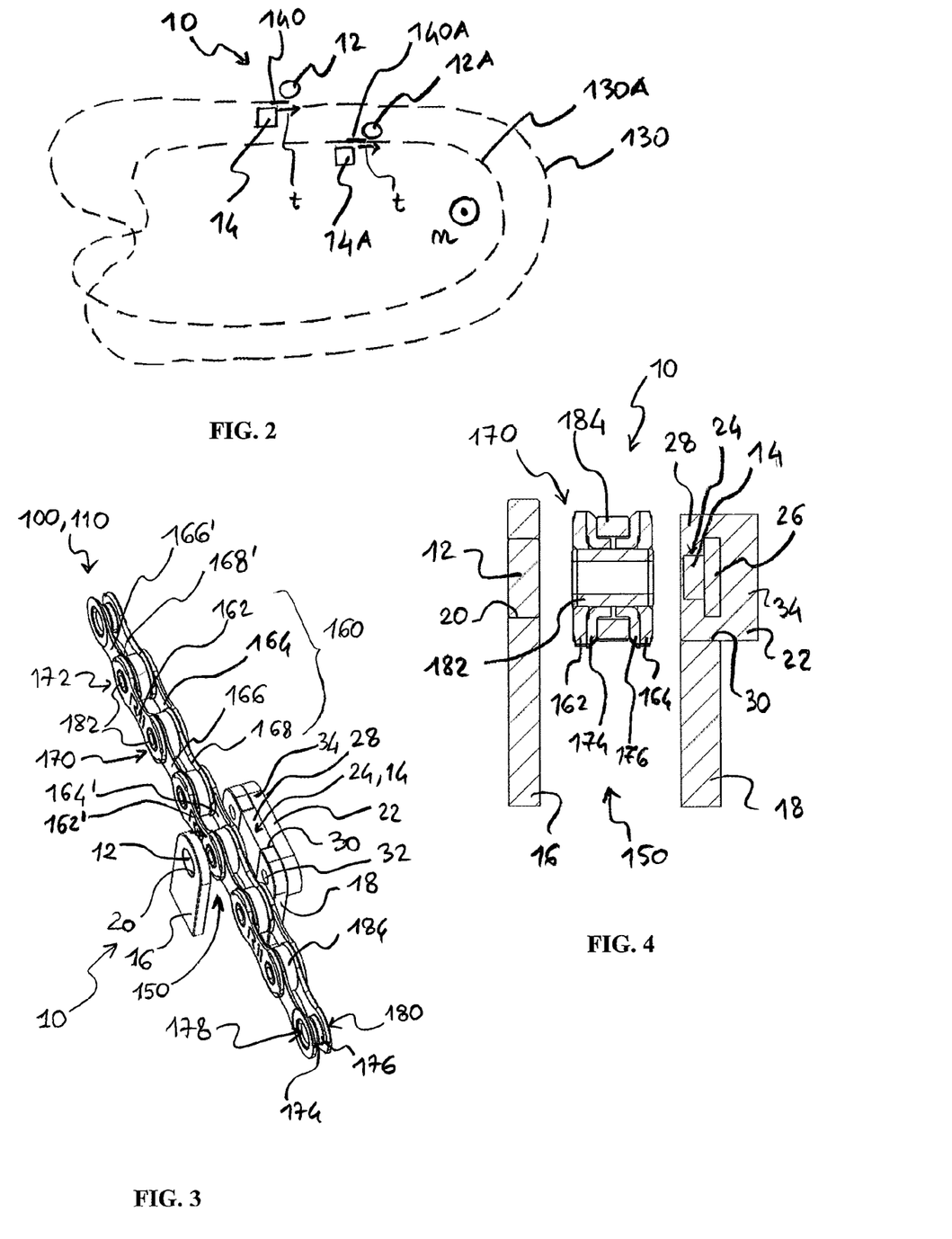
FIG. 2 is a schematic representation of a detector according to the solution, and of its geometric relationship with the motion transmission chain of the bicycle.
FIG. 3 is a perspective view of the detector and of a chain portion.
FIG. 4 is a partial cross-sectional view made across the detector and the chain portion of FIG. 3, FIGS. 5, 6 and 7, 8 are views corresponding to FIGS. 4 and 5 in two different positioning conditions of the chain.

A detector 10 of the presence/movement of a movable non-diamagnetic element and preferably with non-uniform magnetic permeance according to the solution is shown totally schematically in FIG. 2.

The movable element can in particular be a motion transmission chain 100, and reference will be made exclusively to such an example hereinafter in the detailed description for the sake of brevity.

It should also be noted that, alternatively, the movable element with non-uniform magnetic permeance can be a brake cable 1038 that has been given a certain magnetic permeance, or the magnetic permeance of which has been locally changed in one of the aforementioned ways, namely for example by providing segments coated with or cladded by ferromagnetic or paramagnetic material, for example by fixing one or more small rings of ferromagnetic or paramagnetic material along the brake cable, or furthermore by building it with alternating ferromagnetic or paramagnetic material and diamagnetic material, by locally changing the density of ferromagnetic or paramagnetic material, etc.

The movable element can also be a brake caliper or a jaw thereof, possibly modified in an analogous manner.

Still alternatively, the non-diamagnetic movable element and in particular with non-uniform magnetic permeance can be an element of a suspension or any other movable element, in particular an elongated or wire-like movable element.

The detector 10 comprises a magnet 12 and a magnetic field sensor 14. The magnet 12 generates a magnetic field, indicated herein as generated magnetic field. The magnet 12 can be a permanent magnet or an electromagnet.

The magnet 12 and the sensor 14 are arranged in a fixed mutual position. The sensor 14 is immersed in the magnetic field generated by the magnet 12.

The magnet 12 and the sensor 14 are arranged sufficiently close to a position where the chain 100 must pass, when it engages with a predetermined chainring 1002 and sprocket 1004. In greater detail, the motion transmission chain 100 of the bicycle 1000, at a predetermined gear ratio, is wound in a closed loop—as can be seen in FIG. 1, already described in the introductory part of the present description. The path that the chain 100 is intended to follow is shown schematically in FIG. 2 and indicated therein with reference numeral 130.

A length 140 of the closed loop path intended for or followed by the chain 100, at least at a predetermined gear ratio, is immersed in the magnetic field generated by the magnet 12.

If the chain 100 were absent, in said path length 140 there would no longer be any chain portion, and the sensor 14 would detect the magnetic field generated by the magnet 12, not perturbed. The output of the sensor 14 would therefore have a first constant value.

Vice-versa, when the chain extends between the predetermined chainring 1002 and sprocket 1004, in said path length 140 there is actually a chain portion indicated with 150, 152, 154 in FIGS. 3-8, respectively. It should be noted that only a portion 110 of the chain 100, although longer than the chain portion 150, 152, 154, is shown in FIGS. 3-8, in different positions.

Given that the chain 100 is typically made of a paramagnetic material—typically steel—or, less frequently, of a ferromagnetic material, the chain portion 150, 152, 154 actually arranged in the path length 140 perturbs the magnetic field generated by the magnet 12, changing the field lines thereof.

The sensor 14 therefore detects the magnetic field perturbed by the chain portion 150, 152, 154, of average intensity different from that of the generated magnetic field, not perturbed. The output of the sensor 14 therefore has a value different from the first constant value.

In this way, first a detector 10 of the presence of a chain is advantageously accomplished. Electronics, part of or associated with the detector 10, determines that the chain 100 is absent from the path length 140 when an output signal of the sensor 14 has the first constant value, and determines that the chain 100 is present in the path length 140 when the output signal of the sensor 14 has a different value than the first constant value.

If breaking or dropping of the chain is detected, it is possible to carry out a suitable signaling action to the cyclist and/or any precautionary action, for example preventing the actuation of the derailleurs in order to avoid further damaging the transmission system.

The amount of the perturbation of the magnetic field depends on which chain portion is actually in the path length 140 at a given moment, in particular on the magnetic permeance of the chain portion. By construction, the mass distribution and therefore the magnetic permeance is not uniform along the chain 100. Under "mass distribution", in the present description and in the attached claims, the way in which the material forming the chain portion changes and/or is arranged in space is meant to be indicated.

More in particular, the field lines of the magnetic field generated by the magnet 12 find a favored path in the paramagnetic or ferromagnetic material, having high magnetic permeance, and therefore the distribution of the field lines depends on the mass distribution of paramagnetic or ferromagnetic material in the space detected by the sensor 14; on the average, the sensor 14 however detects how much mass of paramagnetic or ferromagnetic material is present.

As an example, each of the links 160 of the chain 100 shown in FIGS. 3-8, wherein a link is understood as a configuration of minimum length that is repeated in the chain 100, comprises:

a pair of metallic outer small plates 162, 164 or outer links, parallel and spaced apart by a first distance, a pair of metallic inner small plates 166, 168 or inner links, parallel and spaced apart by a second distance shorter than the first distance, an intra-link joint element 170, which connects first ends of the outer small plates 162, 164 and first ends of the inner small plates 166, 168, an inter-link joint element 172, which connects second ends of the outer small plates 162, 164 with second ends of inner small plates 166', 168' of an adjacent link or, vice-versa, which connects second ends of the inner small plates 166, 168 with second ends of outer small plates 162', 164' of an adjacent link.

The joint elements 170, 172 are typically equal to each other. Also for this reason, according to a different terminology each of the pairs of small plates—outer 162, 164 or inner 166, 168, respectively—could alone be called chain link.

Each joint element can comprise, for example, a bush formed by two collars 174, 176 extending towards one another about holes 178, 180 of the two inner small plates 166, 168, a rivet 182 extending in the bush and having riveted ends, and a possible rotatable roller 184 extending outside of the bush formed by the collars 174, 176 and having the function of reducing the friction with the teeth of the toothed members 1002, 1004 with which the chain 100 engages in the motion transmission system, teeth that consecutively insert in the space between the paired inner small plates 166, 168 and in the space between the paired outer small plates 162, 164.

The rivet 182 can be replaced by a pin as one piece with one of the outer small plates 162, 164 and having only one riveted end, and/or other configurations of the chain 100 can be provided for.

Figure 5:
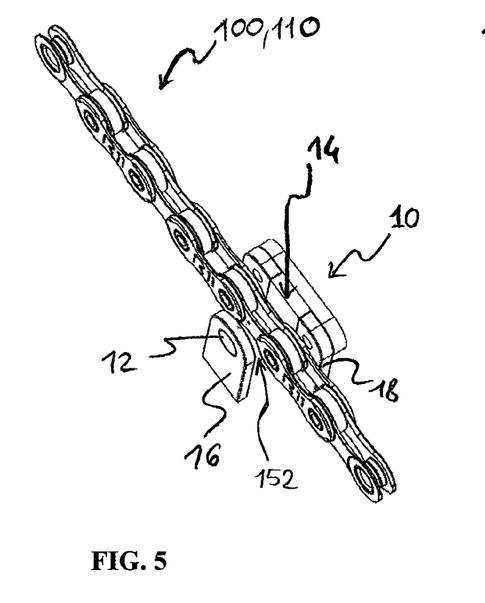
Figure 6:
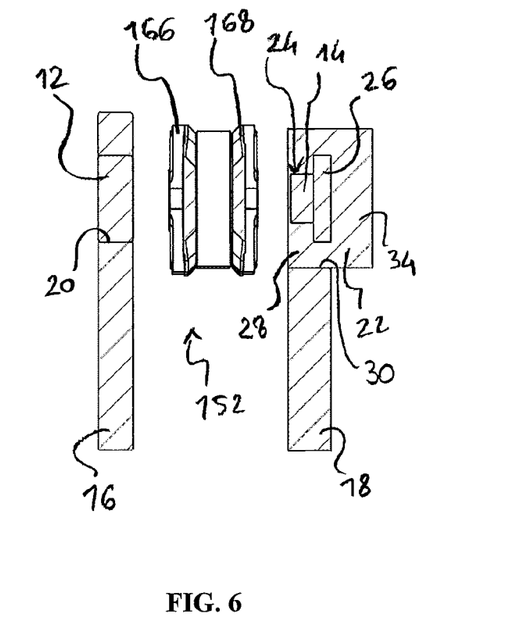
Figure 7:
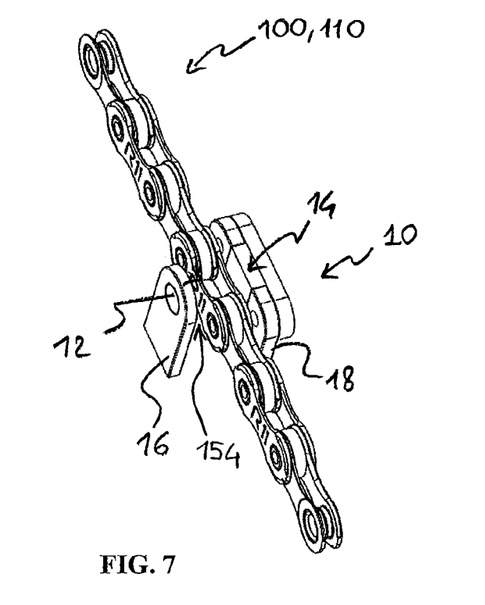
Figure 8:
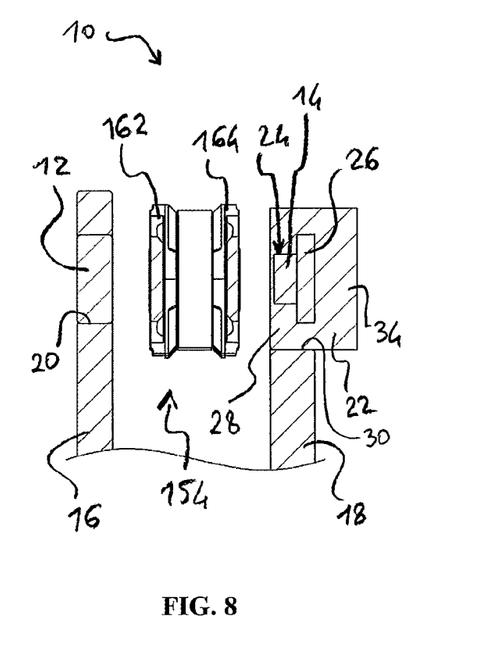

As stated above, the intensity of the perturbed magnetic field, detected by the magnetic field sensor 14, depends on the distribution of mass and of magnetic permeance of the chain portion 100 actually present, at a given moment, in the path length 140. In particular, in the case of the chain 100 described above:

when the chain portion 150 actually in the path length 140 is at a joint element 170, 172, as shown in FIGS. 3 and 4, the intensity of the perturbed magnetic field, detected by the sensor 14, is maximum and the output signal of the sensor 14 has a peak (or vice-versa a valley);

when the chain portion 152 actually in the path length 140 is at the central region of a pair of metallic inner small plates 166, 168, as shown in FIGS. 5 and 6, the intensity of the perturbed magnetic field, detected by the sensor 14, is minimum and the output signal of the sensor 14 has a valley (or vice-versa a peak);

when the chain portion 154 actually in the path length 140 is at the central region of a pair of metallic outer small plates 162, 164, as shown in FIGS. 7 and 8, the intensity of the perturbed magnetic field, detected by the sensor 14, has a value comparable to, although slightly greater than, the minimum, and the output signal of the sensor 14 again has a valley (or vice-versa a peak).

When the cyclist pedals, the chain 100 moves along the intended closed loop path 130: at the path length 140 there are, at subsequent moments, different chain portions corresponding, as far as the mass distribution and the magnetic permeance are concerned, to the portions 150, 152, 150, 154, the sequence endlessly repeating itself (neglecting the "false link" for closing the chain, slightly different from standard links).

The perturbed magnetic field detected by the sensor 14 is therefore variable over time. In particular, the perturbed magnetic field detected by the sensor 14 has a pattern that is substantially periodic and roughly oscillating between the aforementioned maximum value at the joint elements 170, 172 and the aforementioned minimum value at the central region of a pair of small plates 166, 168 or 162, 164, respectively (neglecting their different distribution of mass and magnetic permeance).

If, on the other hand, the chain 100 is stationary, the magnetic field detected by the sensor 14 is constant.

Therefore, the detector 10 can be advantageously used as a detector of the movement of the chain 100. Since it carries out a direct check of the actual movement of the motion transmission chain 100, instead of inferring it from the movement of the toothed members engaged therewith, such a movement detector 10 is extremely accurate.

The aforementioned electronics is configured to determine that the chain 100 is moving when the output signal of the sensor 14 is variable over time, and to determine that the chain 100 is stationary when the output signal of the sensor 14 has a second constant value different from the first constant value indicative of the absence of chain.

In the above it has been assumed that the path length 140 is of a length quite shorter than the length of a chain link 160, namely that the path length 140 or the sensor 14, respectively, is suitably sized based on the distribution of mass and magnetic permeance in a chain link 160.

However, this is not strictly necessary. If in the path length 140 there is, at each time, a chain portion that is longer than those described above, although shorter than a chain link 160, or a chain portion that is as long as one or more entire links plus a link segment, then the mass distribution—and the magnetic permeance—in the path length 140 is still variable over time when the chain 100 is moving, although with variations that are less easily distinguishable.

If the path length 140 were the same length as the length of a chain link 160 or of a multiple thereof, the mass distribution—and the magnetic permeance—in the path length 140 at each moment would always be equivalent, although displaced if the chain 100 is moving, and the magnetic field detected by the sensor 14 would be nearly constant, making it more difficult to detect the movement of the chain 100. In this case, the detector 10 could in any case be used as a presence detector of the chain 10.

As discussed in the introductory part of the present description, the indication of the actual movement of the chain 100 provided by the detector 10 can be advantageously exploited to provide a wake signal.

The indication of the actual movement of the chain 100 provided by the detector 10 can be advantageously exploited also, for example, to prevent an attempt to change gear ratio when the detector 10 detects that the chain 100 is absent or stationary, in order to protect the motion transmission system, as well as for any other purpose.

From what has been described above it can easily be understood that the variability of the perturbed magnetic field detected by the sensor 14 can also be exploited to estimate a speed of the movement of the chain 100 from a repetition period of the output signal of the sensor 14, or an approximation thereof, during an observation time window. Indeed, the higher is the speed of the movement of the chain 100, the higher will be the frequency of appearance of the aforementioned maximum values at the joint elements 170, 172, and of the aforementioned minimum or almost minimum values at the small plates 162-168 will be.

The aforementioned electronics can therefore be configured to calculate or estimate the speed of the movement of the chain 100. By operating directly on the chain 100, instead of inferring the speed thereof from the rotation speed of a toothed member engaged therewith, for example a pulley of the rear derailleur 1016, the movement detector 10 proves to be advantageously very accurate.

In a practical embodiment, the magnetic field sensor 14 can comprise, for example, a Hall effect sensor or a Reed relay. Magnetic field sensors of the aforementioned kind are well known.

The output of the sensor 14 can be a two-levels one depending on whether the magnetic field in which it is immersed is below or above a predetermined threshold, or the output of the sensor can be an analogue signal. The detector 10 can moreover possibly comprise pre-processing electronics of the output signal of such a sensor 14, for example for amplification, filtering and/or approximation, quantization, binarization, digitalization, inversion, etcetera.

Observing a characteristic configuration of the output signal of the sensor 14, such as for example a peak or a valley, for example a peak representative of the passage of the chain portion 150, the electronics can also estimate a stroke of the chain. The stroke is indeed a function of the position of such a characteristic configuration in a length of the output signal of the sensor 14 and/or a function of a displacement of the characteristic configuration during an observation time window of the output signal of the sensor 14.

Again with reference to FIG. 2, advantageously the path length 140 passes through a space between the magnet 12 and the sensor 14, so as to pass in between them as shown. Such a configuration maximizes the perturbation of the generated magnetic field by the chain portion 150, 152, 154 actually present in the sp ace.

Preferably, the magnet 12 and the sensor 14 are aligned along a direction perpendicular to the tangent t to the path length 140. In this way, since the chain links 160 and their segments or portions 150, 152, 154 detected, at each time, follow one another along such a tangent t, the detection capability is optimal.

More preferably, the magnet 12 and the sensor 14 are aligned along a direction n parallel to the rotation axes of the toothed members engaged by the chain 100, such as the chainrings 1002, the sprockets 1004 and the pulleys of the rocker arm 1020 of the rear derailleur 1016. In this way, the chain 100 is left free to vibrate and/or to change the shape of the closed loop path 130.

Because as the gear ratio, namely the chainring 1002—sprocket 1004 pair, changes, the chain 100 takes up a different closed loop configuration and thus has a different intended path, it is possible to size the magnet 12 and the sensor 14 in such a way that at least one second length 140A of a second closed loop path 130A followed by the chain 100, at a second predetermined gear ratio, is also immersed in the magnetic field generated by the magnet 12. In this way, a same magnet/sensor pair can detect the presence and/or the movement of the chain 100 at the various gear ratios.

Alternatively, different magnet/sensor combinations can be provided for the various gear ratios.

Thus, the detector 10 can possibly comprise a second magnet 12A, as shown, which generates a second generated magnetic field and a second magnetic field sensor 14A, wherein the mutual position of the second magnet 12A and of the second sensor 14A is fixed, and the second sensor 14A is immersed in the second generated magnetic field, wherein a second length 140A of a second closed loop path 130A followed by the chain 100, at a second predetermined gear ratio, is immersed in the second generated magnetic field so that, if and when a second chain portion is actually in said second path length 140A, the second sensor 14A detects the second magnetic field perturbed by the second chain portion.

In this way, the detector 10 can be advantageously used to check not only whether the chain 100 is broken or dropped and/or is moving, but also which the actual gear ratio is or, respectively, which toothed wheel 1002, 1004 is currently engaged by the chain 100. Indeed, depending on the actual gear ratio, the chain 100 will extend along one of the closed loop path 130 and the second closed loop path 130A, and thus will be detected by one of the two sensors 14 or 14A.

As an alternative or in addition, for the same purpose the detector 10 can possibly comprise the second magnet 12A that generates the second generated magnetic field, but associated with the same sensor 14 as the magnet 12, namely wherein the mutual position of the second magnet 12A and of said sensor 14 is fixed and the sensor 14 is also immersed in the second generated magnetic field. Also in this case, the second length 140A of the second closed loop path 130A followed by the chain 100, at the second predetermined gear ratio, is immersed in the second generated magnetic field, so that the sensor 14 also detects the second magnetic field perturbed by a possible chain portion 100 that is actually in said second path length 140A.

As an alternative or in addition, the detector 10 can possibly comprise the magnet 12 that generates the generated magnetic field, the sensor 14 and the second magnetic field sensor 14A, wherein the mutual position of the magnet 12 and of the sensor 14 is fixed, and the mutual position of the magnet 12 and of the second sensor 14A is fixed, the sensor 14 is immersed in the generated magnetic field, and the second sensor 14A is immersed in the generated magnetic field, wherein the second length 140A of the second closed loop path 130A followed by the chain 100, at a second predetermined gear ratio, is immersed in the generated magnetic field so that, if and when a second chain portion is actually in said second path length 140A, the second sensor 14A detects the second magnetic field perturbed by the second chain portion.

The configurations outlined above can be repeated, in any combination, for all of the gear ratios. Hereinafter, for the sake of brevity, reference will be made to the detector 10 in its basic configuration comprising a magnet 12 and a sensor 14.

The detector 10 can be mounted at a suitable length of the closed loop path 130, 130A of the chain 100, for example by providing a suitable support fixed to the frame of the bicycle 1000.

In FIGS. 3-8 the magnet 12 and the sensor 14 are schematically illustrated, mounted on two carriers 16, 18, respectively.

The aforementioned carriers 16, 18 are in the form of two parallel and suitably spaced apart flat walls so as to allow the passage, between the magnet 12 and the sensor 14, of the chain 100 in the preferred geometric relationship described above, of alignment along the direction n.

The magnet 12 is supported by the carrier 16. In particular, in the case shown the magnet 12 is glued in a through hole 20, formed in the carrier 18 and better visible in FIGS. 4, 6, and 8. The hole 20 can be replaced by a recessed seat or a blind hole.

As an alternative to gluing, the magnet 12 could just be forcedly fit into the hole 20 or fixed to the carrier 16 in a different manner, for example welded, co-molded, or in other ways.

The sensor 14 is, in the case shown, mounted onto the carrier 18 through a casing 22 configured for being fixed to the carrier 18, and in which a housing seat 24 is defined. It is understood that the casing 22 is made of a suitable material so as not to interfere with the detection by the sensor 14 of the magnetic field generated by the magnet 12, possibly perturbed by the chain portion 150, 152, 154.

The magnetic field sensor 14 is in particular embodied on a Printed Circuit Board (PCB) 26, which can i.a. carry the electronics described above.

A cable (cf. the description of the following FIGS. 9-13) that carries signals and/or power to/from the sensor extends from the board 26, a suitable passage hole being provided in the casing 22. Alternatively, the sensor 14 can be provided with its own battery power supply unit and with a wireless communication circuit, the cable being absent.

More specifically, the casing 22 has a T-shaped cross-section, and the seat 24 is made in a portion 28 thereof corresponding to the leg of the T. The portion 28 of the casing 22 containing the housing seat 24 is inserted in a notch 30 of a corresponding shape, formed on the top of the carrier 18. In particular, the wall of the carrier 18 and the portion 28 of the casing 22 have the same thickness, so that the casing 22 is flush with the face of the carrier 18 facing towards the magnet 12, so that the sensor 14 is in proximity of the magnet 12—and in proximity of the chain portion 150, 152, 154 when present along the path length 140 that extends between the magnet 12 and the sensor 14. However, the notch 30 can be replaced by a recessed seat on the opposite face of the carrier, namely by a groove.

The casing 22 of the sensor 14 is fixed in a suitable manner to the carrier 18. In the embodiment shown, the fixing takes place through suitable screws 32 extending through the portion 34 of the casing 22 corresponding to the head of the T. Alternatively, the casing 22 could be fixed to the carrier 18 in a different manner, for example through gluing, riveting, welding, etc.

The carriers 16, 18 could, for example, comprise two legs of a small fork suspended in a suitable position with respect to the closed loop path 130 followed by the chain 100.

Advantageously, the detector 10 is mounted in a derailleur 1014, 1016 of the motion transmission system of the bicycle 100.

Figure 9:
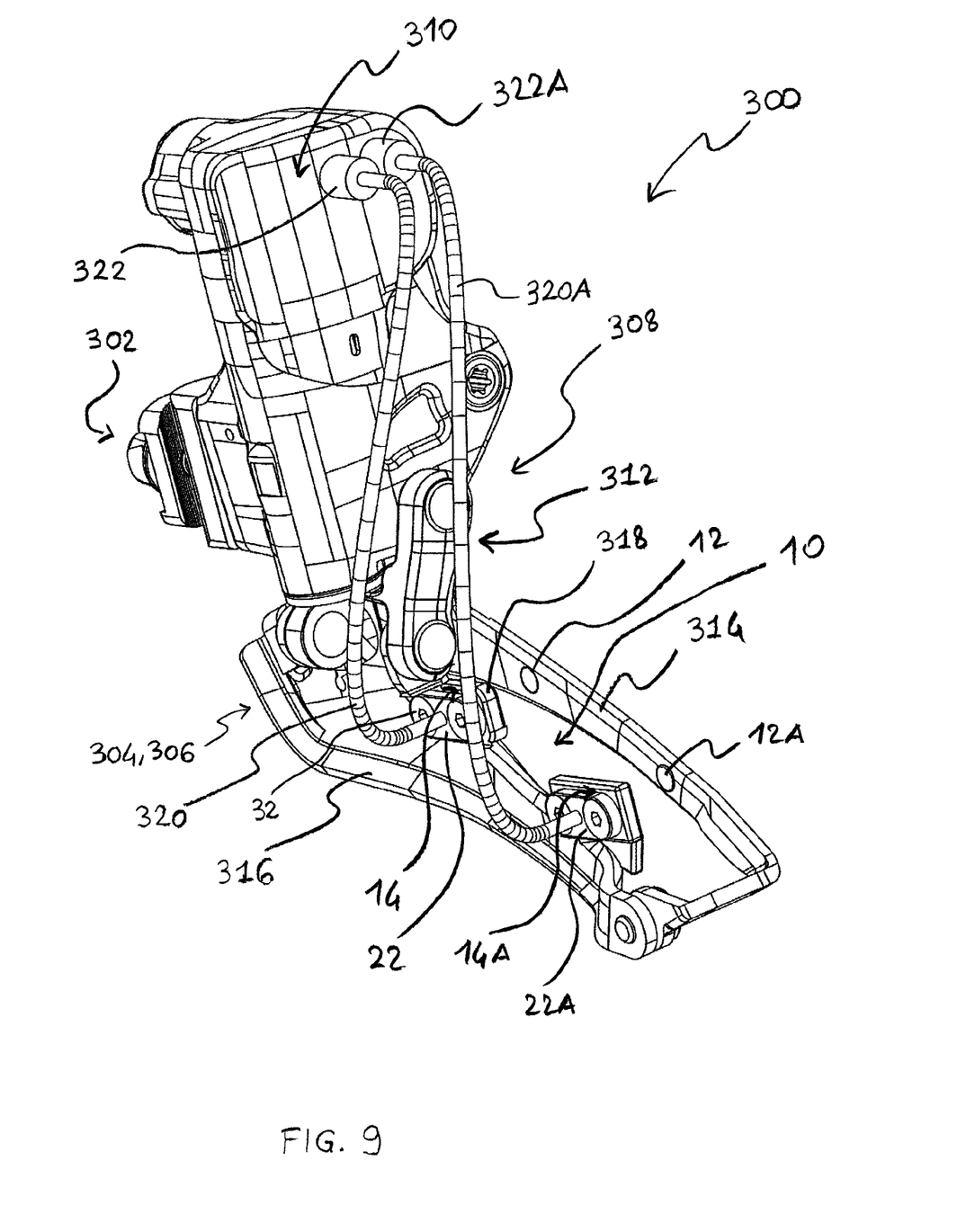
FIG. 9 is a perspective view of a front derailleur carrying the detector according to the solution.

FIG. 9 shows, as an example, a front derailleur, indicated with reference numeral 300, in which the detector 10 is mounted.

The front derailleur 300 comprises a support body 302, configured to be mounted on a bicycle frame at an assembly of chainrings 1002, a movable body 304 comprising a chain guide 306 (in the case shown, movable body and chain guide coincide), and actuation means 308 configured to move the movable body 304 with respect to the support body 302.

In the case shown, the front derailleur 300 is electronic and the actuation means 308 comprise a geared motor 310 and an articulated parallelogram linkage 312, but the front derailleur could be made differently, in a per se well known manner.

The magnet 12 and the sensor 14 of the detector 10 are fixed at the chain guide 306.

The magnet 12 and the sensor 14 are, in particular, fixed at corresponding positions of opposite plates 314, 316 of the chain guide 306, so that the closed loop path 130 followed by the chain 100 passes in between them. When magnet 12 and sensor 14 are at corresponding positions as shown, they turn out to be aligned along a direction perpendicular to the tangent to the path length that the chain 100 follows between the plates of the chain guide 314 themselves.

More specifically, the magnet 12 is fixed to the outer plate 314 of the chain guide 306 and the sensor 14 is fixed to the inner plate 316 of the chain guide 306, at a projection 318 projecting upwards from the inner plate 316, so that the sensor 14 is at the same height as the magnet 12. When magnet 12 and sensor 14 are at the same height, they are aligned along the direction parallel to the rotation axes of the chainrings 1002.

In the present description and in the attached claims, under "inner", the side closest to the bicycle frame in the mounted condition of the derailleur is meant to be indicated, while under "outer", the side furthest from the bicycle frame in the mounted condition of the derailleur is meant to be indicated.

The magnet 12 and the sensor 14 in the mounted positions illustrated turn out to be in an optimal mutual position and at an optimal distance for the described operation of the detector 10.

A cable 320 connecting the casing 22 containing the sensor 14 to the support body 302 is also shown, in which support body 302, in the embodiment shown, the electronics of the derailleur 300 and a possible battery power source unit are housed. The cable 320 is advantageously provided with a removable connector 322 configured for removable connection with a matching connector (not visible) of the support body 302, so as to facilitate a possible replacement of the sensor 14.

The detector 10 further comprises, in the embodiment shown, the second magnet 12A and the second sensor 14A coupled to each other, so as to detect the presence/movement of the chain 100 when it follows one of two closed loop paths, depending on the chainring 1002 with which it engages, in the case of a front gearshift assembly having two chainrings. The second sensor 14A is shown housed in a second casing 22A, from which a cable 320A extends that is provided with a connector 322A, similarly to the sensor 14. However, a single casing housing the two sensors could be provided for.

Also the cabled connection could follow a different scheme, for example in which the second sensor 14A is connected to the first sensor 14 and only the first sensor 14 is connected to the support body 302.

In the case of a front gearshift assembly having three or more chainrings, there will be a third magnet and a third sensor, or more.

All of the other magnet/sensor combinations described above are also possible.

FIGS. 10-13 show, as an example, a rear derailleur, indicated with reference numeral 400, in which the detector 10 is mounted.

Figure 10:
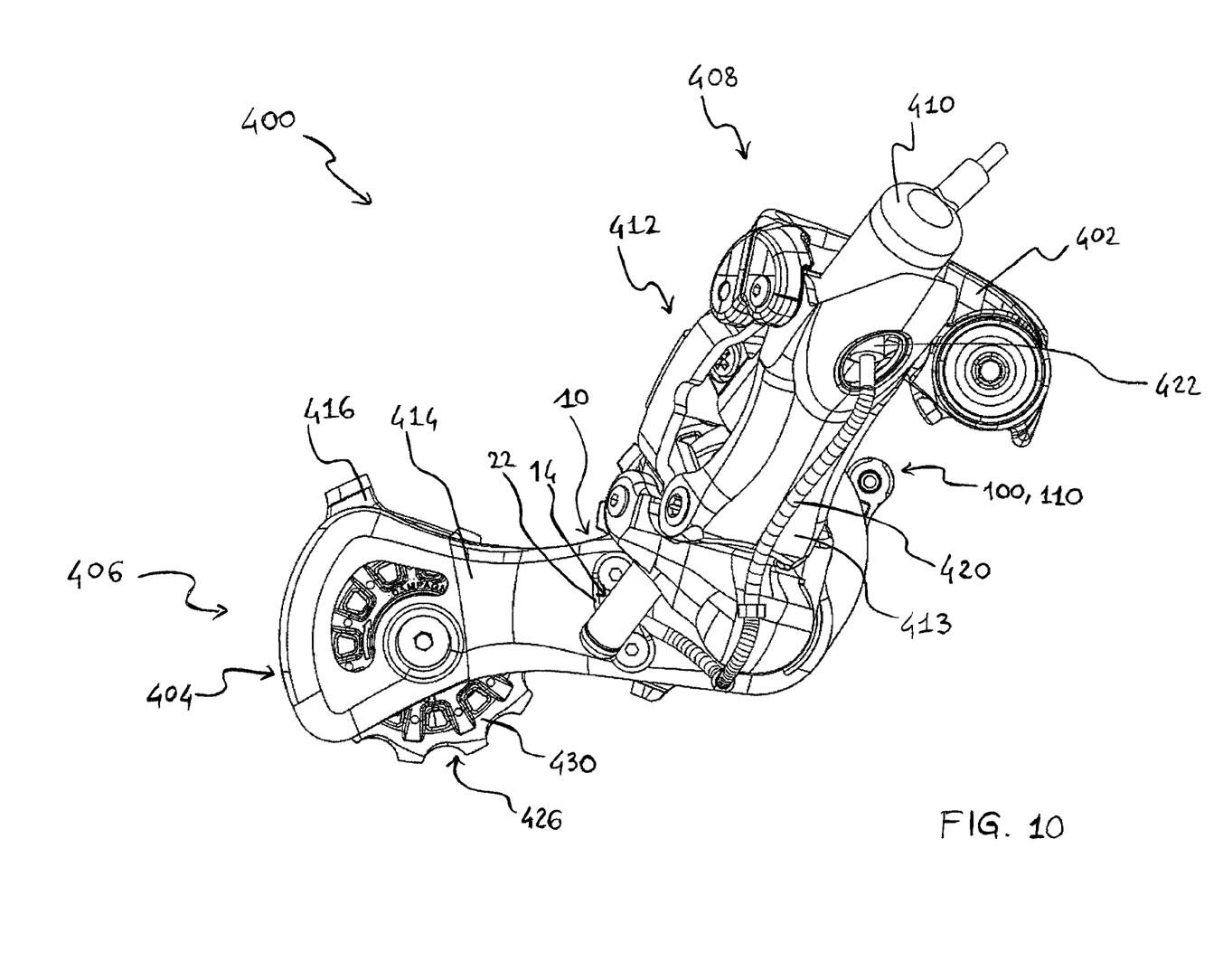
FIGS. 10 and 11 are perspective views of a rear derailleur carrying the detector according to the solution.
Figure 11:
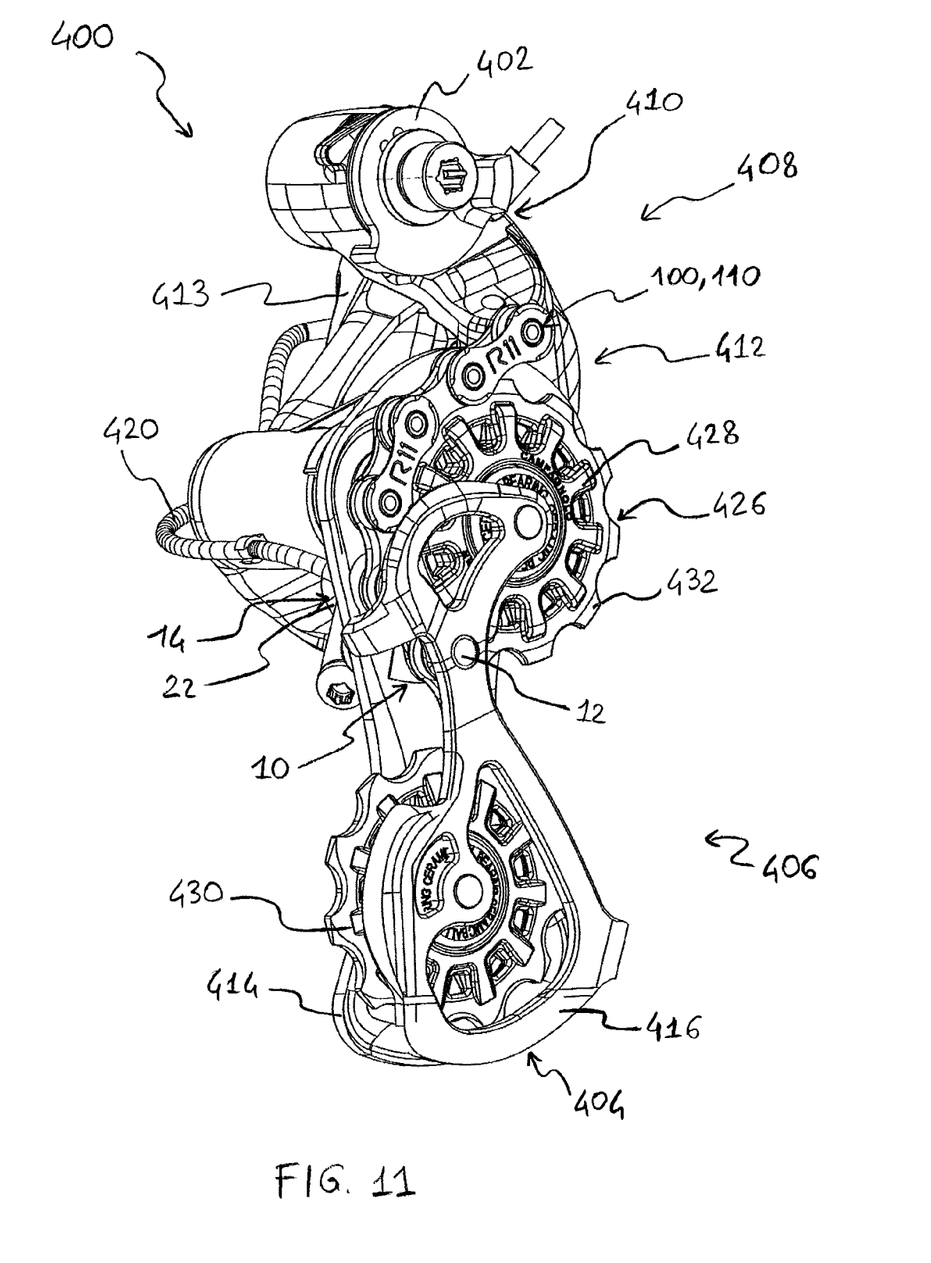

The rear derailleur 400 comprises a support body 402, configured to be mounted on a bicycle frame at an assembly of sprockets 1004, a movable body 404, comprising a chain guide 406, and actuation means 408 configured to move the movable body 404 with respect to the support body 402.

In the case shown, the rear derailleur 400 is electronic and the actuation means 408 comprise a geared motor 410 and an articulated parallelogram linkage 412, the geared motor 410 being arranged along the diagonal of the articulated parallelogram 412, but the rear derailleur could be implemented differently, in a per se well known way.

The magnet 12 and the sensor 14 of the detector 10 are fixed at the chain guide 406.

The magnet 12 and the sensor 14 are, in particular, fixed at corresponding positions of opposite plates 414, 416 of the chain guide 406, so that the closed loop path 130 followed by the chain 100 passes in between them. When magnet 12 and sensor 14 are at corresponding positions, they are aligned along a direction perpendicular to the tangent to the path length that the chain 100 follows between the plates of the chain guide 406 themselves.

More specifically, the sensor 14 is fixed to the outer plate 414 or pulley-carrying plate of the rocker arm or chain tensioner or chain guide 406, and the magnet 12 is fixed to the inner plate 416 or pulley-carrying plate of the rocker arm 306.

Even more specifically, magnet 12 and sensor 14 are fixed to the pulley-carrying plates 414, 416 at the toothing 426 of a pulley 428, more preferably of the upper pulley 428 of the chain tensioner 406.

In the present description and in the attached claims, the terms "upper" and "lower" are used with reference to the normal condition of use of the bicycle.

In this manner, magnet 12 and sensor 14 are aligned along the direction parallel to the rotation axes of the pulleys 428, 430.

Since irrespective of the sprocket 1004 engaged by the chain 100, the latter always follows a same length of a closed loop path that winds around the pulleys 428, 430, the single pair formed by magnet 12 and sensor 14 turns out to be sufficient.

Figure 12:
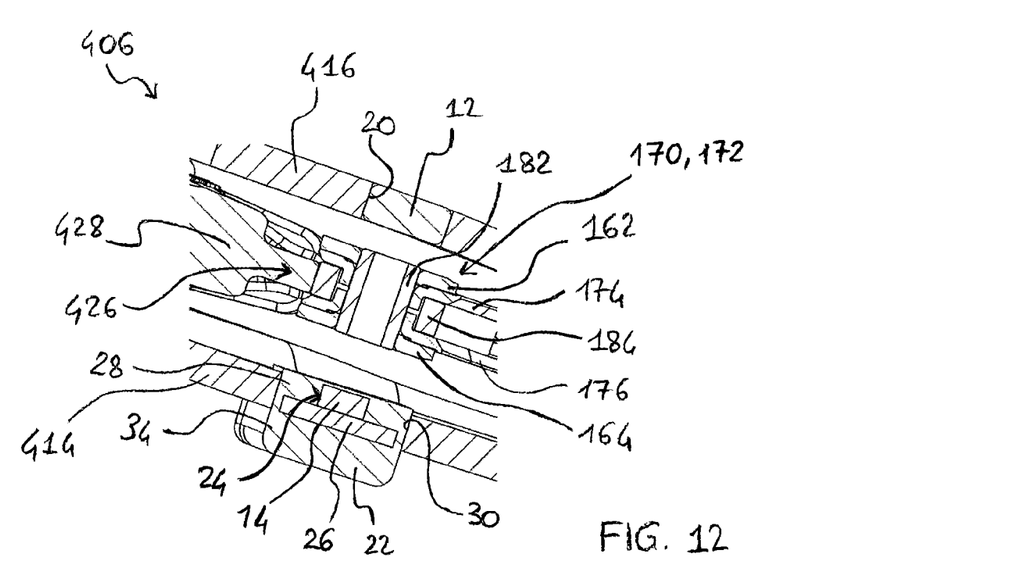
FIGS. 12 and 13 are partial cross-sectional views through the derailleur of FIGS. 10 and 11, corresponding to different positioning conditions of the chain.
Figure 13:
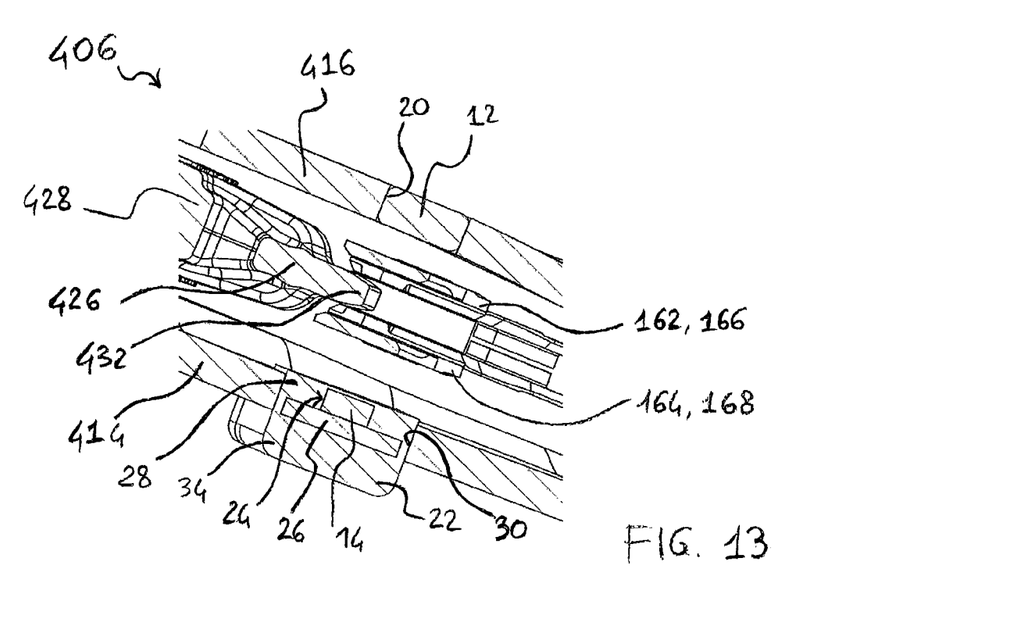

FIGS. 12-13 show a section through the chain guide 406 at the detector 10. In FIG. 12, in the path length immersed in the magnetic field generated by the magnet 12 there is a chain portion corresponding to a joint element 170, 172 of the chain 100. In FIG. 13, in the path length immersed in the magnetic field generated by the magnet 12 there is a chain portion corresponding to a pair of small plates 162-168 (the outer ones 162, 164 in the case shown).

It can be seen that in the condition of FIG. 13, between magnet 12 and sensor 14 a tooth 432 of the toothing 426 of the pulley 428 is also partially arranged, which tooth however does not perturb the magnetic field because the pulleys 428, 430 are typically made of plastic material. In any case, its contribution to the perturbation could be duly taken into account.

Also in this case a cable 420 is shown that connects the casing 22 containing the sensor 14 to the outer connecting rod 413 of the linkage 412, inside which in the embodiment shown the electronics of the derailleur 400 is housed. The cable 420 is advantageously provided with a connector 422 of the removable type configured for the removable connection with a matching connector (not visible) of the outer connecting rod 413, so as to facilitate a possible replacement of the sensor 14.

It should be understood that the front derailleur 300 and/or the rear derailleur 400 can, alternatively, be of a mechanical type.

What is claimed is:

1. A detector arrangement for a bicycle, the detector arrangement comprising:
    a detector having a magnet that generates a magnetic field and a magnetic field sensor, wherein the magnet and the sensor are fixed relative to each other so that the sensor is immersed in the magnetic field, and a length of a path associated with a non-diamagnetic movable element is immersed in the magnetic field and the sensor detects a disruption of the magnetic field when a portion of the non-diamagnetic movable element is in said length of said path; and
    electronics that are in communication with said sensor and configured to output a variable electronic signal in which:
    a first value from the sensor indicates the absence of the non-diamagnetic movable element from the path length and triggers at least one of a warning signal or a precautionary action; and
    a second value from the sensor indicates the presence of the non-diamagnetic movable element in the path length.

2. The detector arrangement for a bicycle according to claim 1, wherein the movable element has a non-uniform magnetic permeance, and the path length has a different length than the length of a configuration of minimum length that is repeated in the movable element, or a multiple thereof.

3. The detector arrangement for a bicycle according to claim 2, wherein the electronics are configured to estimate a stroke of the movable element based on a minimum and a maximum of the value from the sensor.

4. The detector arrangement for a bicycle according to claim 2, wherein the electronics are configured to determine that the movable element is under movement when the value from the sensor is variable over time, and to determine that the movable element is stationary when the value from the sensor has a different value than the first value.

5. The detector arrangement for a bicycle according to claim 1, wherein the electronics are configured to determine that the movable element is moving when the value from the sensor is variable over time, and to determine that the movable element is stationary when the value from the sensor is constant and different than the first value.

6. The detector arrangement for a bicycle according to claim 1, wherein the electronics are configured to estimate a speed of movement of the movable element from a repetition period of the value from the sensor, or an approximation thereof, during an observation time window.

7. The detector arrangement for a bicycle according to claim 1, wherein the electronics are configured to estimate a stroke of the movable element based on a minimum and a maximum of the value from the sensor during an observation time window.

8. The detector arrangement for a bicycle according to claim 1, wherein the path length passes through a space between the magnet and the sensor.

9. The detector arrangement for a bicycle according to claim 1, comprising at least one second magnet that generates a second generated magnetic field and at least one second magnetic field sensor, wherein the mutual position of the second magnet and of the second sensor is fixed and the second sensor is immersed in the second generated magnetic field, wherein a second length of a second closed loop path intended for a motion transmission chain of the bicycle, at a second predetermined gear ratio, is immersed in the second generated magnetic field, so that, if in said second path length there is at least one actual chain portion, the second sensor detects the magnetic field perturbed by said actual chain portion.

10. The detector arrangement for a bicycle according to claim 1, wherein the movable element has a non-uniform magnetic permeance, and the path length has a shorter length that is different than the length of a configuration of minimum length that is repeated in the movable element, or a multiple thereof.

11. A bicycle derailleur, comprising:
a support body, configured to be mounted on a bicycle frame at an assembly of coaxial toothed wheels of the bicycle,
a movable body comprising a chain guide,
actuation means configured to move the movable body with respect to the support body, and
the detector arrangement according to claim 1, wherein the magnet and the sensor are fixed at the chain guide.

12. The bicycle derailleur according to claim 11, wherein the derailleur is a front derailleur.

13. The bicycle derailleur according to claim 11, wherein the derailleur is a rear derailleur, and the chain guide comprises two pulley-carrying plates, wherein the magnet and the sensor are fixed to said pulley-carrying plates at corresponding positions.

14. Bicycle derailleur according to claim 11, wherein the chain guide comprises two pulley-carrying plates and the magnet and the sensor are fixed to the pulley-carrying plates at a toothing of one pulley of a chain tensioner.

15. Bicycle equipment, comprising:
a non-diamagnetic element, and
a detector of presence and movement of the non-diamagnetic element, comprising a magnet that generates a generated magnetic field, and a magnetic field sensor, wherein a mutual position of the magnet and of the sensor is fixed, and the sensor is immersed in the generated magnetic field,
wherein the non-diamagnetic element is intended to be movable through the generated magnetic field, and
the detector is configured to trigger at least one of a warning signal or a precautionary action upon detecting an absence of the non-diamagnetic element from a predetermined path length.

16. The bicycle equipment according to claim 15, wherein the bicycle equipment is a derailleur, and the non-diamagnetic element is a motion transmission chain.

17. The bicycle equipment according to claim 15, wherein the bicycle equipment is a braking system, and the non-diamagnetic element is a brake cable or a brake caliper.

* * * * *